United States Patent
Gundavelli et al.

(10) Patent No.: US 11,337,147 B2
(45) Date of Patent: *May 17, 2022

(54) DYNAMIC ROAMING PARTNER PRIORITIZATION BASED ON SERVICE QUALITY FEEDBACK

(71) Applicant: Cisco Technology, Inc., San Jose, CA (US)

(72) Inventors: Srinath Gundavelli, San Jose, CA (US); Indermeet Singh Gandhi, Bangalore (IN); Mark Grayson, Berkshire (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/073,454

(22) Filed: Oct. 19, 2020

(65) Prior Publication Data
US 2021/0037454 A1    Feb. 4, 2021

Related U.S. Application Data

(63) Continuation of application No. 16/393,455, filed on Apr. 24, 2019, now Pat. No. 10,813,042.

(51) Int. Cl.
| | |
|---|---|
| *H04W 48/16* | (2009.01) |
| *H04W 8/06* | (2009.01) |
| *H04W 48/08* | (2009.01) |
| *H04W 8/08* | (2009.01) |
| *H04W 8/18* | (2009.01) |
| *H04W 48/18* | (2009.01) |
| *H04W 84/12* | (2009.01) |

(52) U.S. Cl.
CPC ............ *H04W 48/16* (2013.01); *H04W 8/06* (2013.01); *H04W 8/08* (2013.01); *H04W 8/186* (2013.01); *H04W 48/08* (2013.01); *H04W 48/18* (2013.01); *H04W 84/12* (2013.01)

(58) Field of Classification Search
CPC ..... H04W 48/16; H04W 48/08; H04W 48/18; H04W 8/06; H04W 8/08; H04W 8/186
USPC ....................................... 455/432.1
See application file for complete search history.

(56) References Cited

U.S. PATENT DOCUMENTS

| | | | |
|---|---|---|---|
| 2010/0157823 A1 | 6/2010 | Li et al. | |
| 2010/0274682 A1 | 10/2010 | Pai | |
| 2013/0090124 A1* | 4/2013 | Panchal | H04W 24/02 455/452.1 |
| 2017/0289788 A1* | 10/2017 | Lalwaney | H04L 41/0803 |
| 2018/0302951 A1 | 10/2018 | Christopherson et al. | |

* cited by examiner

*Primary Examiner* — Joel Ajayi
(74) *Attorney, Agent, or Firm* — Merchant & Gould P.C.

(57) ABSTRACT

Dynamic roaming partner prioritization based on service quality feedback may be provided. First, a server associated with an enterprise may receive performance data and location data for each of a plurality of service provider networks from a plurality of end use devices associated with the enterprise. Next, the server may assign a ranking to a plurality of service providers by location based upon information. The information may comprise the received performance data and the location data corresponding to each of the plurality of service provider networks. The server may then push the ranking to a first end use device.

20 Claims, 4 Drawing Sheets

DYNAMIC ROAMING PARTNER PRIORITIZATION BASED ON SERVICE QUALITY FEEDBACK

RELATED APPLICATIONS

The present application is a continuation of U.S. patent application Ser. No. 16/393,455 filed Apr. 24, 2019, the disclosure of which is considered part of and incorporated herein by reference in its entirety.

TECHNICAL FIELD

The present disclosure relates generally to roaming partner prioritization.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
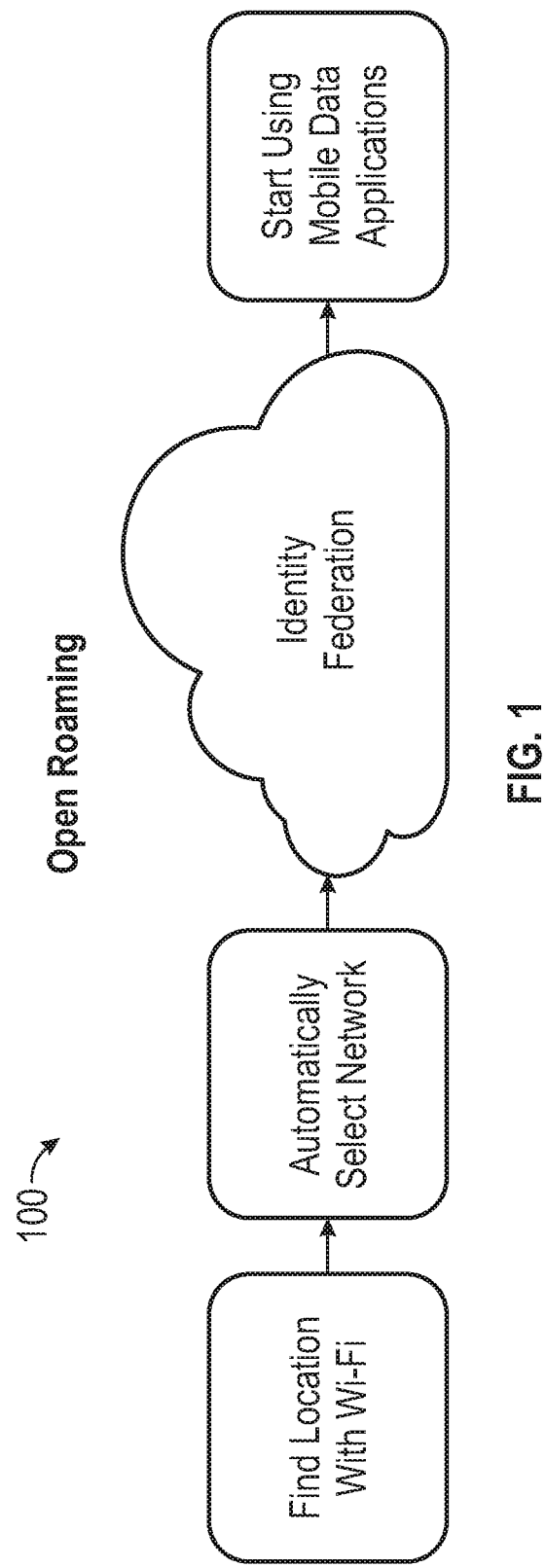
FIG. 1 illustrates an open roaming architecture.

Dynamic roaming partner prioritization based on service quality feedback may be provided. First, a server associated with an enterprise may receive performance data and location data for each of a plurality of service provider networks from a plurality of end use devices associated with the enterprise. Next, the server may assign a ranking to a plurality of service providers by location based upon information. The information may comprise the received performance data and the location data corresponding to each of the plurality of service provider networks. The server may then push the ranking to a first end use device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates an open roaming architecture 100 that may provide a seamless onboarding experience to clients (e.g., end use devices) for Wi-Fi access regardless of a Service Provider (SP) or enterprise affiliation. In the open roaming architecture 100 of FIG. 1, an open roaming identity federation may link enterprise, SP ID, and identity providers to provide a process for seamless onboarding across participating Service Set Identifiers (SSIDs) with Roaming Consortium Identifiers (RCOIs) indicating open roaming. However, policy may still remain based on a user selected realm and may not depend on the location or performance of a visited network. Moreover, an enterprise through its own policy server may not influence a target SSID selection when the enterprise users are in Wi-Fi coverage that supports open roaming.

Similarly, the enterprise may have a partnership with more than one service provider (i.e., service partner) for providing connectivity services for its users when they are outside the enterprise premises. However, this may be based on pricing with no ability to consider the performance aspects of the network that the users are experiencing based on the location. Even though Embedded Subscriber Identification Modules (eSIMs) may provide the capability to hold multiple profiles and Remote Subscriber Identification Module (RSIM) architecture may allow for remote provisioning of SIM profiles, conventional processes may not provide a way for the enterprise to influence the profile suitable to its users and activate it depending on the performance of the network based on service quality feedback.

Figure 2A:
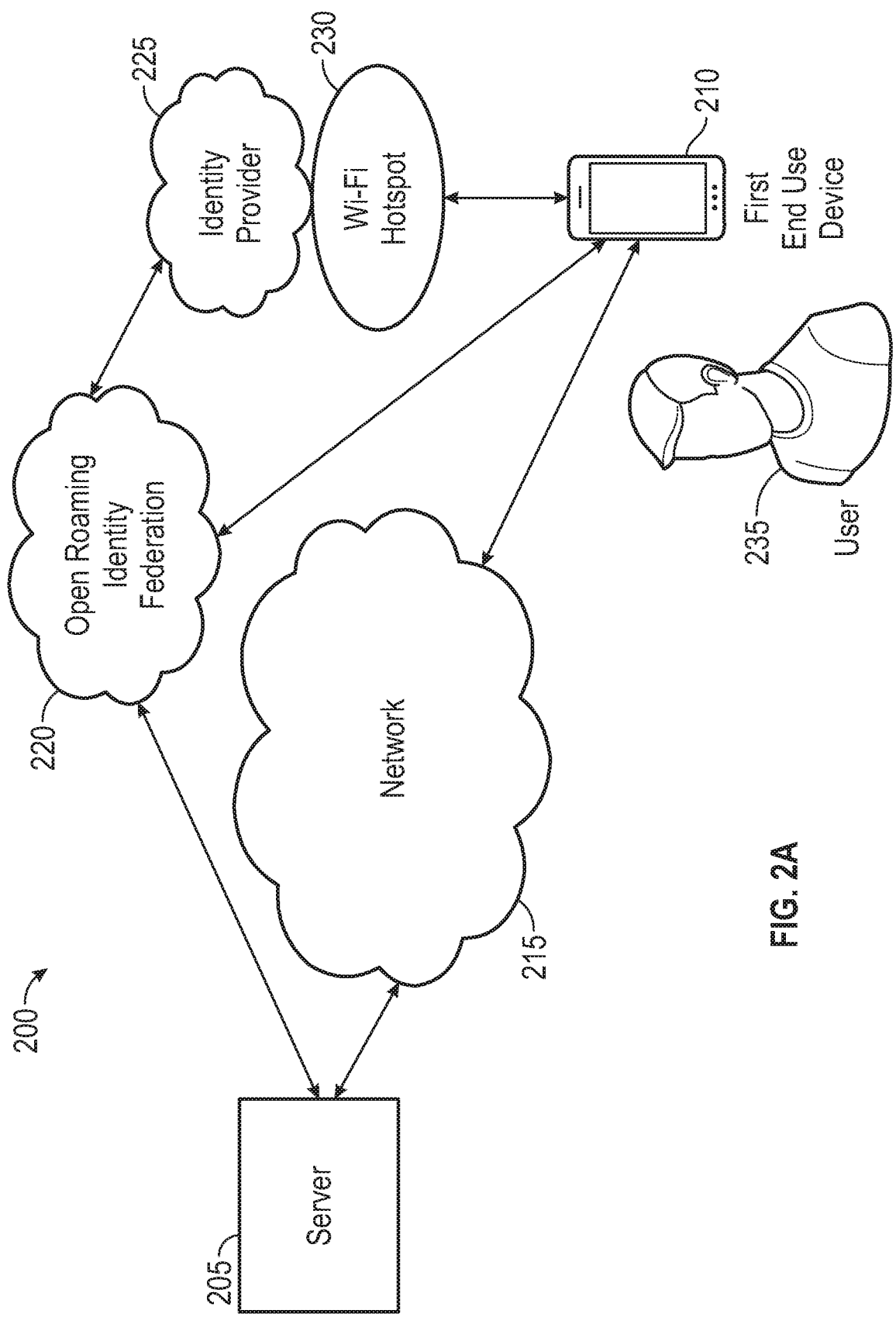
FIG. 2A is a block diagram of an operating environment for roaming in a service partner's Wi-Fi coverage.

FIG. 2A shows a block diagram of an operating environment 200 for roaming in a service partner's Wi-Fi coverage consistent with embodiments of the disclosure. As shown in FIG. 2A, operating environment 200 may comprise a server 205, a first end use device 210, a network 215, an open roaming identity federation 220, an Identity Provider (IdP) 225, and a Wi-Fi hotspot 230.

Server 205 may comprise, but is not limited to, a computing device 400 as described in more detail below with respect to FIG. 4 below. First end use device 210 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using a Wi-Fi network or a cellular network. Network 215 may comprise, for example, the Internet.

Open roaming identity federation 220 may comprise the open roaming identity federation as described above with respect to FIG. 1. Identity Provider (IdP) 225 may offer user authentication as a service and may comprise a system that creates, maintains, and manages identity information for principals while providing authentication services to relying applications within a federation or distributed network. Wi-Fi hotspot 230 may comprise a physical location where users may obtain Internet access, using Wi-Fi technology, via a Wireless Local Area Network (WLAN) using a router connected to a service provider.

Figure 2B:
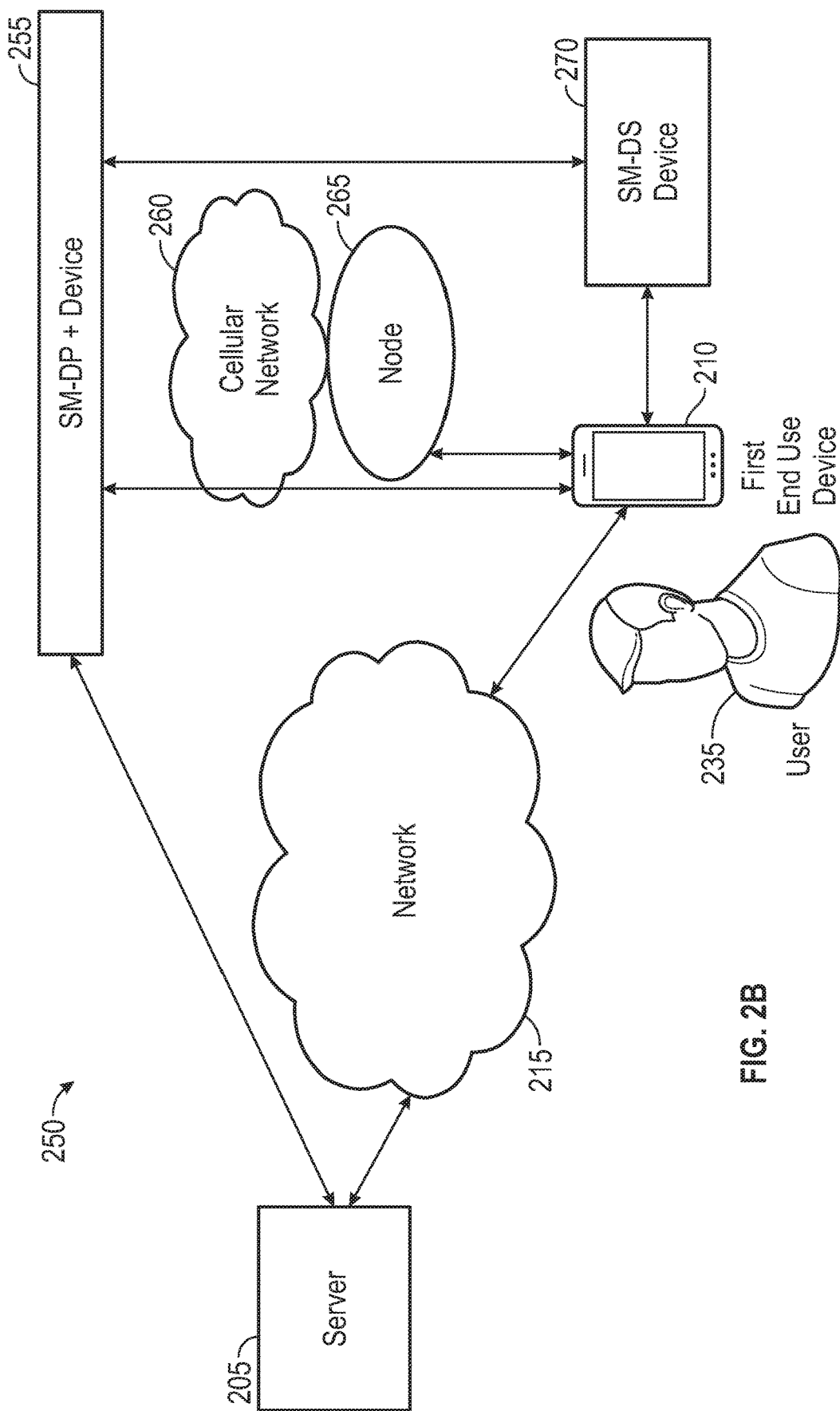
FIG. 2B is a block diagram of an operating environment for roaming in a service partner's cellular coverage.

FIG. 2B shows a block diagram of an operating environment 250 for roaming in a service partner's cellular coverage consistent with embodiments of the disclosure. As shown in FIG. 2B, operating environment 250 may comprise server 205, first end use device 210, and network 215 as described above with respect to FIG. 2A.

In addition, operating environment 250 may further comprise, a Subscription Manager-Data Preparation+ (SM-DP+) device 255, a cellular network 260, a node 265, and a Subscription Manager-Discovery Server (SM-DS) device 270. SM-DP+ device 255 and SM-DS device 270 may be a part of a Global System for Mobile communications Association (GSMA) consumer solution controlled by a service provider to manage end use devices including RSIM provisioning. SM-DP+ device 255 may create, download, remotely management (e.g., enable, disable, update, and delete) and protect user credentials (i.e., a profile). SM-DS device 270 may allow SM-DP+ 255 to reach an Embedded Universal Integrated Circuit Card (eUICC) on first end use device 210 without having to know which network first end use device 210 is connected to. This feature may be important because end use devices (e.g., first end use device 210) may be connected using different access networks with different addresses. SM-DS device 270 may overcome this issue by allowing SM-DP+ device 255 to post alerts to a secure noticeboard and by allowing users devices to extract those alerts.

Cellular network 260 may comprise, but is not limited to, a Long-Term Evolution (LTE) broadband cellular network, a Fourth Generation (4G) broadband cellular network, or a Fifth Generation (5G) broadband cellular network, operated by a service provider. Node 265 may comprise a device that may be connected to cellular network 260 that may communicate directly and wirelessly with end use devices (e.g., first end use device 210). Node 265 may comprise, but is not limited to, an eNodeB (eNB) or an eNodeG (eNG).

The elements described above of operating environment 200 and operating environment 250 may be practiced in hardware and/or in software (including firmware, resident software, micro-code, etc.) or in any other circuits or systems. The elements of operating environment 200 and operating environment 250 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 200 and operating environment 250 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 200 and operating environment 250 may be practiced in computing device 400.

Figure 3:
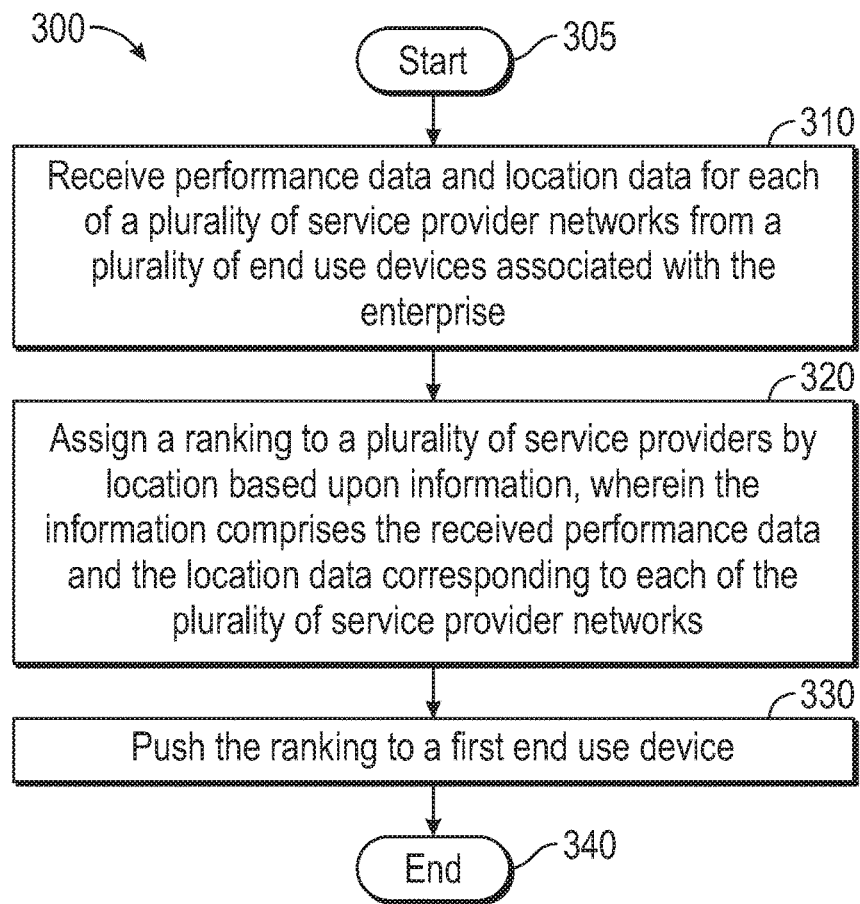
FIG. 3 is a flow chart of a method for providing dynamic roaming partner prioritization based on service quality feedback.

FIG. 3 is a flow chart setting forth the general stages involved in a method 300 consistent with an embodiment of the disclosure for providing dynamic roaming partner prioritization based on service quality feedback. Method 300 may be implemented using server 205 as described above with respect to FIG. 2A and FIG. 2B. Server 205 may be implemented using computing device 400 described in more detail below with respect to FIG. 4. Ways to implement the stages of method 300 will be described in greater detail below.

Method 300 may begin at starting block 305 and proceed to stage 310 where server 205 may receive performance data and location data for each of a plurality of service provider networks from a plurality of end use devices associated with the enterprise. For example, an enterprise application may be installed by the enterprise on the plurality of end use devices. The plurality of end use devices may include first end use device 210.

The enterprise application on first end use device 210 may be configured to measure and collect detailed Key Performance Indicators (KPIs) for each access network that first end use device 210 attaches too (e.g., Wi-Fi hot spot 230 of FIG. 2A and node 265 of FIG. 2B). The KPI's may be collected from interface statistics or may be explicitly measured. The KPI's may include, but are not limited to, packet loss, jitter, and latency over Wi-Fi interfaces (e.g., FIG. 2A) or cellular LTE, 4G, or 5G interfaces (e.g., FIG. 2B). The enterprise application may then push the performance data to server 205. The performance data may indicate, for example, jitter, packet loss, and latency for each of SSID visited (e.g., FIG. 2A) and for each service provider network visited (e.g., FIG. 2B) along with the location and time for the visit.

From stage 310, where server 205 may receive the performance data and the location data for each of the plurality of service provider networks from the plurality of end use devices associated with the enterprise, method 300 may advance to stage 320 where server 205 may assign a ranking to a plurality of service providers by location based upon information. The information may comprise, but is not limited to, the received performance data and the location data corresponding to each of the plurality of service provider networks. For example, server 205 may assign weights to reported metrics from the performance data and may factor pricing agreements with different vendors (e.g., service providers) into the ranking process to determine a preferred ranking of service providers for the enterprise's users.

Consequently, embodiments of the disclosure may tie together the enterprise with the service providers (e.g., for both Wi-Fi roaming and cellular roaming) to provide the user devices with preferred networks dynamically. For example, the enterprise may want its employees (e.g., users) to be on a first service provider network in the San Jose area based on the performance data, but while in New York, the enterprise may want its employees (e.g., users) to be on a second service provider network based on the performance data. Furthermore, the enterprise may want its employees (e.g., users) to associate to a first SSID when walking inside a certain environment (e.g., a mall) based on the performance data.

Once server 205 assigns the ranking to the plurality of service providers by location based upon the information in stage 320, method 300 may continue to stage 330 where server 205 may push the ranking to first end use device 210. For example, when roaming in a service partner's Wi-Fi coverage (i.e., the open roaming identity federation example of FIG. 2A), server 205 may update open roaming identity federation 220 over a trusted link with the new preferred ranking of roaming partners that the enterprise prefers. Open roaming identity federation 220 may then signal the new preferred ranking to first end device 210 over a secured channel.

When roaming in a service partner's cellular coverage (i.e., the cellular coverage example of FIG. 2B), the enterprise may have business relations with its service provider roaming partners. Furthermore, end use device 210 may have eUICC and eSIM capabilities for storing multiple profiles, each corresponding to a different Mobile Network Operator (MNO) (i.e., service provider roaming partner). In this example, server 205 may update the profile through the roaming partner's SP-DP+ device 255 to the eUICC on first end use device 210. As a consequence, the roaming partner's MNO profile may be pushed to first end use device 210. As an alternative, SM-DS device 270 may be updated to enable the discovery of the SM-DP+ 255 for new users.

Consistent with embodiments of the disclosure, using the above process, the preferred roaming partner's ranking may be signaled to first user device 210 over a secure link from server 205 or open roaming identity federation 220 and may be updated on first user device 205 to be used for future connections (i.e., FIG. 2A). In the case of a cellular roaming partner (i.e., FIG. 2B), the ranking may be sent to first user device 210 over a secure link from server 205 or through, for example, an ES8+ interface from SM-DP+ 255 with first user device 210 as part of the RSIM provisioning procedure. Consequently, embodiments of the disclosure may provide a process for the enterprise to influence a profile suitable to its users and to activate the profile depending on the performance of the network based on service quality feedback. Once server 205 pushes the ranking to first end use device 210 in stage 330, method 300 may then end at stage 340.

Figure 4:
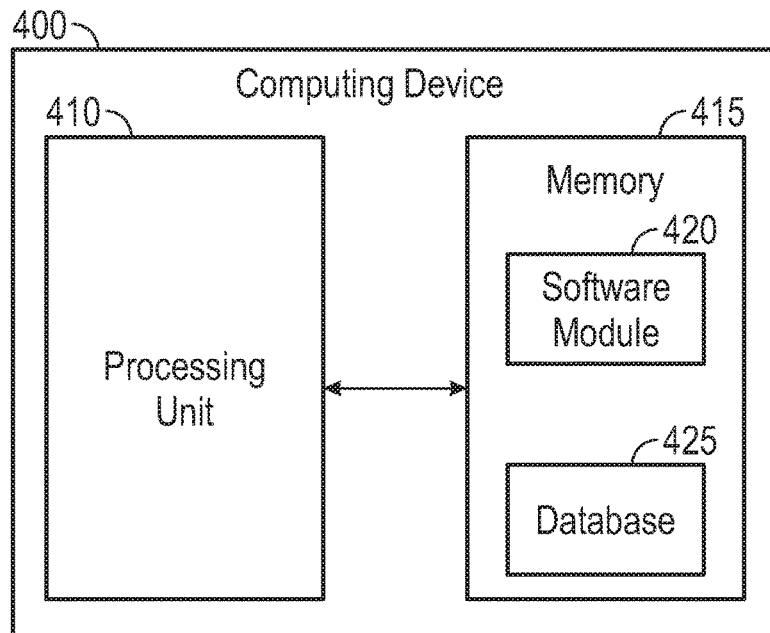
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing dynamic roaming partner prioritization based on service quality feedback, including for example, any one or more of the stages from method 300 described above with respect to FIG. 3. Computing device 400, for example, may provide an operating environment for elements of operating environment 200 or operating environment 250 including, but not limited to, server 205 and first client device 210. Elements of operating environment 200 or operating environment 250 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 2A and FIG. 2B may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a server associated with an enterprise, performance data and location data for each of a plurality of service provider networks from a plurality of end use devices associated with the enterprise;
   assigning, by the server, a ranking to each of the plurality of service provider networks by location based upon the received performance data and location data corresponding to each of the plurality of service provider networks, wherein assigning the ranking to the plurality of service provider networks further comprises assigning the ranking to each of the plurality of service provider networks based on pricing agreements with each of the plurality of service provider networks;
   pushing, by the server, the ranking to a first end use device; and
   enabling, by the server, a profile change in the first end use device, wherein the first end use device comprises a plurality of profiles each corresponding one of the plurality of service provider networks, wherein enabling the profile change in the first end use device comprises enabling the profile change in the first end use device via remote Subscriber Identification Module (SIM) provisioning to one of the plurality of profiles based on the ranking, wherein enabling the profile change in the first end use device via remote SIM provisioning comprises enabling the profile change through a Subscription Manager-Data Preparation+ (SM-DP+) device to an Embedded Universal Integrated Circuit Card (eUICC) on the first end use device, and wherein enabling the profile change through the SM-DP+ device to the eUICC on the first end use device comprises enabling the profile change through the SM-DP+ device to the eUICC on the first end use device without having to know which network the first end use device is connected to.

2. The method of claim 1, wherein receiving the performance data comprises receiving the performance data indicating jitter, packet loss, and latency.

3. The method of claim 1, wherein receiving the performance data comprises receiving the performance data indicating a time the performance data was obtained.

4. The method of claim 1, wherein receiving the performance data for each of the plurality of service provider networks comprises receiving the performance data for each of the plurality of service provider networks wherein each of the plurality of service provider networks comprises one of the following: a Wi-Fi network and a cellular network.

5. The method of claim 1, further comprising receiving the pricing agreements the enterprise has with the plurality of service provider networks.

6. The method of claim 1, wherein assigning the ranking comprises assigning weights to the received performance data and the location data corresponding to each of the plurality of service provider networks.

7. The method of claim 6, wherein assigning the ranking comprises assigning the ranking to the plurality of service provider networks based on the weights and the pricing agreements with each of the plurality of service provider networks.

8. A system comprising:
   a memory storage; and
   a processing unit coupled to the memory storage, wherein the processing unit is operative to:
   receive performance data and location data for each of a plurality of service provider networks from a plurality of end use devices associated with an enterprise;
   assign a ranking to the plurality of service provider networks by location based upon the received performance data and location data corresponding to each of the plurality of service provider networks, wherein the processing unit being operative to assign the ranking to the plurality of service provider networks further comprises the processor being operative to assign the ranking to each of the plurality of service provider networks based on pricing agreements with each of the plurality of service provider networks;
   push the ranking to a first end use device through an open roaming identity federation; and
   enable a profile change in the first end use device, wherein the first end use device comprises a plurality of profiles each corresponding one of the plurality of service provider networks, wherein the processing unit being operative to enable the profile change in the first end use device comprises the processing unit being operative to enable the profile change in the first end use device via remote Subscriber Identification Module (SIM) provisioning to one of the plurality of profiles based on the ranking, wherein the processing unit being operative to enable the profile change in the first end use device via remote SIM provisioning comprises the processing unit being operative to enable the profile change through a Subscription Manager-Data Preparation+ (SM-DP+) device to an Embedded Universal Integrated Circuit Card (eUICC) on the first end use device, and wherein the processing unit being operative to enable the profile change through the SM-DP+ device to the eUICC on the first end use device comprises the processing unit being operative to enable the profile change through the SM-DP+ device to the eUICC on the first end use device without having to know which network the first end use device is connected to.

9. The system of claim 8, wherein the performance data indicates a time the performance data was obtained.

10. The system of claim 8, wherein each of the plurality of service provider networks comprises one of the following: a Wi-Fi network and a cellular network.

11. The system of claim 8, wherein the information further comprises a pricing agreement the enterprise has with a service provider that provides the service provider network corresponding to the received performance data.

12. The system of claim 8, wherein the processing unit being operative to assign the ranking comprises the processing unit being operative to assign weights to the received performance data and the location data corresponding to each of the plurality of service provider networks.

13. The system of claim 12, wherein the processing unit being operative to assign the ranking comprises the processing unit being operative to assign the ranking to the plurality of service provider networks based on the weights and the pricing agreements with each of the plurality of service provider networks.

14. A non-transitory computer-readable medium that stores a set of instructions which when executed perform a method comprising:
receiving, by a server associated with an enterprise, performance data and location data for each of a plurality of service provider networks from a plurality of end use devices associated with the enterprise;
assigning, by the server, a ranking to a plurality of service provider networks by location based the received performance data and location data corresponding to each of the plurality of service provider networks, wherein assigning the ranking to the plurality of service provider networks further comprises assigning the ranking to each of the plurality of service provider networks based on pricing agreements with each of the plurality of service provider networks;
pushing, by the server, the ranking to a first end use device; and
enabling, by the server, a profile change in the first end use device, wherein the first end use device comprises a plurality of profiles each corresponding one of the plurality of service provider networks, wherein enabling the profile change in the first end use device comprises enabling the profile change in the first end use device via remote Subscriber Identification Module (SIM) provisioning to one of the plurality of profiles based on the ranking, wherein enabling the profile change in the first end use device via remote SIM provisioning comprises enabling the profile change through a Subscription Manager-Data Preparation+ (SM-DP+) device to an Embedded Universal Integrated Circuit Card (eUICC) on the first end use device, and wherein enabling the profile change through the SM-DP+ device to the eUICC on the first end use device comprises enabling the profile change through the SM-DP+ device to the eUICC on the first end use device without having to know which network the first end use device is connected to.

15. The non-transitory computer-readable medium of claim 14, wherein receiving the performance data comprises receiving the performance data indicating jitter, packet loss, and latency.

16. The non-transitory computer-readable medium of claim 14, wherein receiving the performance data comprises receiving the performance data indicating a time the performance data was obtained.

17. The non-transitory computer-readable medium of claim 14, wherein receiving the performance data for each of the plurality of service provider networks comprises receiving the performance data for each of the plurality of service provider networks wherein each of the plurality of service provider networks comprises one of the following: a Wi-Fi network and a cellular network.

18. The non-transitory computer-readable medium of claim 14, further comprising receiving the pricing agreements the enterprise has with the plurality of service provider networks.

19. The non-transitory computer-readable medium of claim 14, wherein assigning the ranking comprises assigning weights to the received performance data and the location data corresponding to each of the plurality of service provider networks.

20. The non-transitory computer-readable medium of claim 19, wherein assigning the ranking comprises assigning the ranking to the plurality of service provider networks based on the weights and pricing agreements with each of the plurality of service provider networks.

* * * * *